(12) United States Patent
Yamazaki

(10) Patent No.: US 7,692,836 B2
(45) Date of Patent: Apr. 6, 2010

(54) SCANNING TYPE IMAGE DISPLAY DEVICE (75) Inventor: Tetsuro Yamazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 261 days.

(21) Appl. No.: 11/882,905

(22) Filed: Aug. 7, 2007

(65) Prior Publication Data
US 2008/0158632 A1 Jul. 3, 2008

(30) Foreign Application Priority Data
Aug. 8, 2006 (JP) ............................. 2006-215565
Jul. 12, 2007 (JP) ............................. 2007-183344

(51) Int. Cl.
G02B 26/08 (2006.01)

(52) U.S. Cl. .................................. 359/202.1
(58) Field of Classification Search .............. 359/198.1, 359/202.1
See application file for complete search history.

(56) References Cited

U.S. PATENT DOCUMENTS
6,937,372 B2 * 8/2005 Kandori et al. .......... 359/202.1

FOREIGN PATENT DOCUMENTS
JP A 01-245780 9/1989

* cited by examiner

Primary Examiner—Euncha P Cherry
(74) Attorney, Agent, or Firm—Oliff & Berridge, PLC (57) ABSTRACT A scanning-type image display device includes: a light source section; a horizontal scanner; a vertical scanner, and a vertical scanner control section in such manner that, when a discrepancy occurs between a target scan line number and a scannable line number, and when a difference obtained by subtracting of the target scan line number from the scannable line number is a positive value, the vertical scanner control section controls the vertical scanner so as to put vertical scanning on standby within a time range from a point of time at which horizontal scanning is completed in a first frame to a point of time at which a horizontal scanning start signal corresponding to a vertical synchronizing signal of the video signal in a second frame is input, and restarts the vertical scanning in synchronization with an input timing of the horizontal scanning start signal.

11 Claims, 3 Drawing Sheets

SCANNING TYPE IMAGE DISPLAY DEVICE

CROSS-REFERENCE TO RELATED APPLICATION

This application claims priority from Japanese Patent Application No. 2006-215565, filed on Aug. 8, 2006, and Japanese Patent Application No. 2007-183344, filed on Jul. 12, 2007, the contents of which are incorporated herein by reference.

BACKGROUND

1. Technical Field

The present invention relates to a scanning-type image display device.

2. Related Art

In recent years, a scanning-type image display device has been proposed that displays images by raster scanning a beam of light such as laser light on a projection surface.

Since this device can achieve a perfect black by stopping the supply of laser light, a higher contrast display is possible compared to a projector or the like that uses a liquid crystal light valve, for example.

Moreover, since an image display device that employs laser light is characterized by having a high color purity due to the laser light being a single wavelength and by readily shaping (focusing) the beam due to high coherence, it is expected to be used as a high-definition display that realizes high resolution and high color reproduction.

Also, in contrast to liquid crystal displays and plasma displays or the like, since the scanning-type image display device does not have fixed pixels, there is no concept of pixel number and so has the advantage of easily changing the resolution.

In order to generate an image with the scanning-type image display device, it is necessary to scan light in two dimensions using scanners such as a polygon mirror or a galvano-mirror.

Although there is a method of scanning light in two dimensions while moving a single scanner in the two directions of a horizontal direction and a vertical direction, in this case, there is a problem in that the constitution and control of the scanning system becomes complicated.

Therefore, there has been proposed a scanning-type image display device provided with two sets of scanners each scanning light in one dimension so as to incorporate horizontal scanning and vertical scanning, respectively.

Conventionally, it is normal to use a polygon mirror or a galvano-mirror for a scanner of the both directions. A projection device that employs a polygon mirror in scanner of the both directions is disclosed in Japanese Unexamined Patent Application No. H01-245780.

Although a device that uses a polygon mirror is introduced in Japanese Unexamined Patent Application No. H01-245780, increasing the resolution of an image format entails higher scanning frequencies, which approaches the limits of a polygon mirror or a galvano-mirror.

Therefore, in recent years systems have been announced that utilize Micro Electro Mechanical Systems (MEMS) technology in high-speed scanners.

A scanner that utilizes MEMS technology (hereinafter simply referred to as a "MEMS scanner") is one manufactured utilizing micro-processing technology of a semiconductor material, such as silicon, and drives a mirror supported by a torsion spring or the like with electrostatic force or the like.

This scanner can scan light by causing the mirror to travel in a reciprocating motion via the interaction of the electrostatic force and the restoring force of the spring.

By using a MEMS scanner, it is possible to achieve a scanner that can be operated at a high frequency and large deflection angle compared to a conventional scanner. Thereby, it is possible to display high-resolution images.

In order to realize scanning with a high speed MEMS scanner, since the mirror must be made to travel in a reciprocation manner at the resonance point, assuming a given resolution, it is necessary to design and fabricate the resonance point of the mirror so as to agree with that resolution.

However, in the case that the resonance frequency of the mirror cannot be made to be a common multiple of the refresh rate of a display image, by driving the mirror deviated from the resonance point, it is impossible to ensure sufficient scanning amplitude.

Conversely, if the scanning frequency is matched with the resonance frequency, synchronization of the horizontal scanning and vertical scanning cannot be achieved, leading to image distortion.

Moreover, even if a mirror is manufactured so that the resonance frequency of the mirror is perfectly adjusted to common multiple of the refresh rate, it is conceivable for the temperature of the MEMS mirror to change as a result of the usage environment and the illumination state of the light, which would thereby cause slight change in the resonance point of the mirror.

In this case as well, as stated above, synchronization of the horizontal scanning and vertical scanning cannot be achieved, leading to image distortion.

Also, in the case of manufacturing errors in the above-mentioned scanner and changes in the resonance point during use or the like, synchronization of the image signal and the scanner cannot be achieved, leading to the generation of frames that cannot be displayed.

Examples of problems in the case of using a MEMS mirror were given above, but these problems are not limited to a device using a MEMS mirror, being common to devices that use other resonant-type scanners such as a resonant-type galvano-mirror or the like.

SUMMARY

An advantage of some aspects of the invention is to provide a scanning-type image display device in which that it is possible to ensure favorable display quality by reliably synchronizing the horizontal scanning and vertical scanning.

A first aspect of the invention provides a scanning-type image display device including: a light source section that emits light; a horizontal scanner that scans the light in a horizontal direction, a vertical scanner that scans the light in a vertical direction; and a vertical scanner control section that controls an operation of the vertical scanner, in such a manner that, when a discrepancy occurs between a target scan line number at which the horizontal scanner is to scan as determined by a format of a video signal and a scannable line number at which the horizontal scanner is actually capable of scanning, and when a difference obtained by subtracting the target scan line number from the scannable line number is a positive value, the vertical scanner control section controls the vertical scanner so as to put vertical scanning by the vertical scanner on standby within a time range from a point of time at which horizontal scanning by the horizontal scanner is completed in a first frame to a point of time at which a horizontal scanning start signal corresponding to a vertical synchronizing signal of the video signal in a second frame is input, and restarts the vertical scanning by the vertical scanner in synchronization with an input timing of the horizontal scanning start signal.

The "horizontal scanner" mentioned here is a scanner that, among two directions of scanning, performs high-speed scanning, while the "vertical scanner" is a scanner that performs low-speed scanning. The two do not necessarily correspond to the horizontal and vertical of an image.

For example, even when the horizontal side of an image format is the one being scanned at a high speed, in the case of constituting an actual device, it is conceivable for the pixel information from the image signal to be reconstituted so that the vertical aspect of an image becomes the one that is scanned at a high speed.

Also, the "first frame" here refers to a given frame, and the "second frame" is the next one frame that follows the first frame.

As stated above, in the scanning-type image display device, it is conceivable for problems related to manufacturing errors of a scanner and problems related to changes in characteristics during use of a scanner to arise.

Here, the occurrence of such problems in the "horizontal scanner" shall be supposed.

When such problems occur, a discrepancy (deviation) occurs between the number of scan lines that the horizontal scanner should scan as determined by the format of the video signal (target scan line number) and the number of scan lines that the manufactured horizontal scanner is actually capable of scanning (scannable line number).

This deviation is capable of occurring in two directions.

That is, there is the case of the scannable line number being less than the target scan line number (the difference obtained by subtracting the target scan line number from the scannable line number is negative) and the case of the scannable line number being greater than the target scan line number (the difference obtained by subtracting the target scan line number from the scannable line number is positive).

However, in the case the former deviation arising, that is, the scannable line number is less than the target scan line number, the scanner is not able to complete scanning of the entire screen, that is, is deficient in performance, and so must be regarded as defective.

Accordingly, the scanning-type image display device of the first aspect of the invention is applicable to the case of the scannable line number being greater than the target scan line number (the difference obtained by subtracting the target scan line number from the scannable line number being positive).

In the case of the scannable line number being greater than the target scan line number (the difference obtained by subtracting the target scan line number from the scannable line number being positive), after the horizontal scanner has completed the horizontal scanning of the entire screen in a given first frame, there remains time until the input of the horizontal scanning start signal that corresponds to the vertical synchronizing signal of the video signal of the following second frame.

Therefore, during this remaining time, the vertical scanner control section puts the vertical scanning by the vertical scanner on standby, and then restarts the vertical scanning by the vertical scanner from the initial position in synchronization with the input timing of the horizontal scanning start signal of the second frame.

As a result of the vertical scanner control section performing the above described control according to the first aspect of the invention, the horizontal scanning and the vertical scanning are reliably synchronized, and so it is possible to provide a scanning-type image display device that has favorable display quality with no image distortion or the like.

Also, by restarting the vertical scanning based on the horizontal scanning start signal that corresponds to the vertical synchronizing signal of the video signal, the video signal and scanners are synchronized, and so the problem does not arise of undisplayable frames being generated.

Specific methods of putting the vertical scanning by the vertical scanner on standby could conceivably include temporarily stopping the vertical scanner, or returning the vertical scanner to the initial position using the entire portion of the remaining time until the second frame without temporarily stopping the vertical scanner.

It is preferable that, in the scanning-type image display device of the first aspect of the invention, the vertical scanning by the vertical scanner be put on standby by temporarily stopping the vertical scanner.

With this constitution, it is possible to more flexibly respond to changes in characteristics or the like during use of the scanner.

Also, it is preferable that, in the scanning-type image display device of the first aspect of the invention, two methods of controlling the timing of restarting the scanning be applied after temporarily stopping the vertical scanning by the vertical scanner.

In the first method, when the scannable line number is not an integer, the vertical scanner control section calculates a stoppage time that corresponds to the difference obtained by subtracting the scannable line number from the next integer greater than the value of the scannable line number. Next, the vertical scanner control section stops the vertical scanning by the vertical scanner for just the stoppage time from the point of time at which the horizontal scanning is completed by the horizontal scanner in the first frame. Next the vertical scanner control section restarts the vertical scanning by the vertical scanner after the stoppage time has elapsed, and calculates from the second frame onward a stoppage time in any frame based on the above described stoppage time.

The first method is particularly effective in the case in which the discrepancy between the design target value and the actual value of the vertical scanner (the difference obtained by subtracting the target scan line number from the scannable line number) is always constant, and in the case in which the scan line number that the horizontal scanner scans in any frame is constant.

In this method, it is possible to control the start timing of vertical scanning by the vertical scanner in any frame with only the stoppage time found by the above described calculation. Therefore, there is no need for the vertical scanner control section to monitor the horizontal scanning start signal corresponding to the vertical synchronizing signal of the video signal of the second frame.

For that reason, the circuit constitution of the vertical scanner control section is simple.

On the other hand, in the second method, the vertical scanner control section restarts the vertical scanning by the vertical scanner with the horizontal scanning start signal that is first input following the input of the vertical synchronizing signal in the second frame serving as a trigger.

The second method is particularly effective in the case in which the discrepancy between the design target value and the actual value of the vertical scanner (the difference obtained by subtracting the target scan line number from the scannable line number) is not constant, and for such cases as the scan line number that the horizontal scanner scans in each frame fluctuating.

In the case of the scan line number fluctuating for each frame, when controlling the start timing of vertical scanning by the vertical scanner with only the stoppage time, there are cases of the drawing position deviating by one scan line, leading to image distortion.

On this point, if the vertical scanning by the vertical scanner is restarted with the horizontal scanning start signal that is first input following the input of the vertical synchronizing signal of the second frame serving as a trigger, the above described problem of imaged distortion does not arise.

It is preferable that, in the scanning-type image display device of the first aspect of the invention, the horizontal scanner scan the lights in reciprocation, and the vertical scanner control section determine whether the horizontal scanning start signal that is first input following the input of the vertical synchronizing signal in the second frame is a horizontal scanning start signal on the outgoing side or a horizontal scanning start signal on the returning side, and bring into alignment the scanning direction of the horizontal scanner and the output order of the pixel data string in the video signal in accordance with that determination result.

This constitution is particularly effective for such cases as when the deviation between the design target value and actual value of the horizontal scanner (the difference obtained by subtracting the target scan line number from the scannable line number) is not constant and randomly fluctuates over time.

When the horizontal scanner performs reciprocal scanning, scanning is performed in alternating directions for each scan line, so that, assuming for example that the initial position of overall scanning is the top left of the screen, the first scan line at the top of the screen is from left to right, and the second scan line below that is from right to left.

That is, scanning is performed from left to right on a outgoing side scan line, and performed from right to left on a returning side scan line.

Here, assuming the scanning frequency of the horizontal scanner randomly fluctuates, the stoppage time of the vertical scanner also randomly fluctuates.

In this case, when restarting scanning by the vertical scanner, it is not uniquely decided whether the horizontal scanning start signal on the outgoing side or the returning side comes first.

Thus, assuming the first initial horizontal scanning signal is on the returning side following the input of a vertical synchronizing signal, in the above example, since the horizontal scanner scans from right to left on one hand while the pixel data string that is synchronized with the vertical synchronizing signal is arranged from the left, which is the original initial position, to the right, there is the risk that the image will be horizontally flipped.

However, if the vertical scanner control section determines whether the first horizontal scanning start signal following the input of the vertical synchronizing signal is on the outgoing side or the returning side, and, in accordance with the determination result, bring into alignment the scanning direction of the horizontal scanner and the output order of the pixel data string in the video signal as in the constitution of the invention, it is possible to prevent problems such as flipping of the image.

Also, it is preferable that, in the scanning-type image display device of the first aspect of the invention, the two following methods of bringing into alignment the scanning direction of the horizontal scanner and the output order of the pixel data string be applied.

In the first method, when the vertical scanner control section determines that the horizontal scanning start signal that is first input following the input of the vertical synchronizing signal in the second frame is, among the horizontal scanning start signal on the outgoing side and the horizontal scanning start signal on the returning side, a horizontal scanning start signal in which the scanning direction of the horizontal scanner does not agree with the output order of the pixel data string in the video signal, the vertical scanner control section keeps the vertical scanning by the vertical scanner stopped, and when the vertical scanner control section determines that the horizontal scanning start signal is a horizontal scanning start signal in which the scanning direction of the horizontal scanner agrees with the output order of the pixel data string in the video signal, the vertical scanner control section restarts the vertical scanning by the vertical scanner with the horizontal scanning start signal serving as a trigger.

That is, in the first method, when the horizontal scanning start signal is determined to be a horizontal scanning start signal in which the scanning direction of the horizontal scanner agrees with the output order of the pixel data string, the vertical scanning by the vertical scanner is restarted with the first horizontal scanning start signal serving as a trigger.

Accordingly, when the vertical scanner control section determines that the horizontal scanning start signal is one without alignment, the operation of the vertical scanner should be stopped until the next horizontal scanning start signal with alignment comes.

In the second method, when the vertical scanner control section determines that the horizontal scanning start signal that is first input following the input of the vertical synchronizing signal in the second frame is, among the horizontal scanning start signal on the outgoing side and the horizontal scanning start signal on the returning side, a horizontal scanning start signal in which the scanning direction of the horizontal scanner does not agree with the output order of the pixel data in the video signal, the vertical scanner control section restarts the vertical scanning by the vertical scanner with the horizontal scanning start signal serving as a trigger and in addition reverses the output order of the pixel data string in the video signal.

That is, the second method is conceived from the concept that, even if the vertical scanner control section determines there to be a horizontal scanning start signal in which the scanning direction of the horizontal scanner does not agree with the output order of the pixel data and restarts the vertical scanning by the vertical scanner with the horizontal scanning start signal serving as a trigger, the output order of the pixel data string in the video signal should be reversed.

The first method and the second method each have advantages and disadvantages. The advantage of the first method is that, although the pixel data string is stored in a storage section such as memory, to the extent of there being no need to reverse the pixel data string, the constitutions of the circuit that controls the reading of pixel data from the memory and the drive circuit of the light source sections are simplified.

On the other hand, the disadvantage of the first method is that, when the horizontal scanning start signal is one without agreement, it is necessary to store the pixel data in memory or the like while stopping the operation of the vertical scanner, thus requiring a large storage capacity.

The advantage of the second method is, conversely to the disadvantage of the first method, that the storage capacity of the memory or the like may be less, while the disadvantage is that the constitutions of the control circuit that reads pixel data and the drive circuit of the light source sections become complicated.

It is preferable that the scanning-type image display device of the first aspect of the invention further include a horizontal scanning frequency detecting section that detects the scanning frequency of the horizontal scanner. In the scanning-type image display device, the vertical scanner control section is additionally provided with a function to change the scanning frequency of the vertical scanner in response to fluctuations in the scanning frequency of the horizontal scanner detected by the horizontal scanning frequency detecting section.

For example, in the case of the scanning frequency of the horizontal scanner randomly fluctuating, when the vertical scanner operates as designed it moves in tandem with fluctuations in the scanning frequency of the horizontal scanner, leading to deviations in the drawing position of each horizontal scan line.

However, because the vertical scanner control section is provided with a function that changes the scanning frequency of the vertical scanner in response to fluctuations in the scanning frequency of the horizontal scanner, it is possible to also correct a deviation in the drawing position of each horizontal scan line, and so the display quality can be further improved.

A second aspect of the invention provides a scanning-type image display device including: a light source section that emits light; a horizontal scanner that scans the light in a horizontal direction; a vertical scanner that is the light in a vertical direction; and a vertical scanner control section that controls the vertical scanner so that the vertical scanner temporarily stops within a time range from a point of time at which horizontal scanning by the horizontal scanner is completed in a first frame to a point of time at which a horizontal scanning start signal corresponding to a vertical synchronizing signal of the video signal in a second frame is input.

Even in the constitution of the scanning-type image display device, the vertical scanner control section temporarily stops the vertical scanner within a surplus time between the completion of horizontal scanning of the entire screen in a first frame and the input of a horizontal scanning start signal corresponding to a vertical synchronizing signal of the video signal in the following second frame. By the above described control by the vertical scanner control section, it is possible to provide a scanning-type image display device that can reliably synchronize horizontal scanning and vertical scanning and so has favorable display quality with no image distortion or the like.

The phrase "temporarily stop" is mentioned through the description. The phrase "temporarily stop" of the invention means stopping the scanner while maintaining the stopped condition for a determined length of time. The phrase "temporarily stop" is a different concept from the concept of the scanner stopping for a moment at a turning point of the reciprocating motion thereof.

It is preferable that, in the scanning-type image display device of the first aspect and the second aspect of the invention, the horizontal scanner be a resonating-type MEMS scanner.

Since a resonating-type MEMS scanner has the characteristics of small size, high speed, high accuracy, and quietness, it is possible to realize a scanning-type image display device that is compact quiet, and has a high display quality according to the present constitution.

DESCRIPTION OF EXEMPLARY EMBODIMENTS

First Embodiment

Hereinafter, a first embodiment of the invention will be described with reference to FIGS. 1 to 3.

In the first embodiment, a description is given using as an example a laser scanning-type image display device that displays an image on a screen by scanning laser light (scanning-type image display device).

Figure 1:
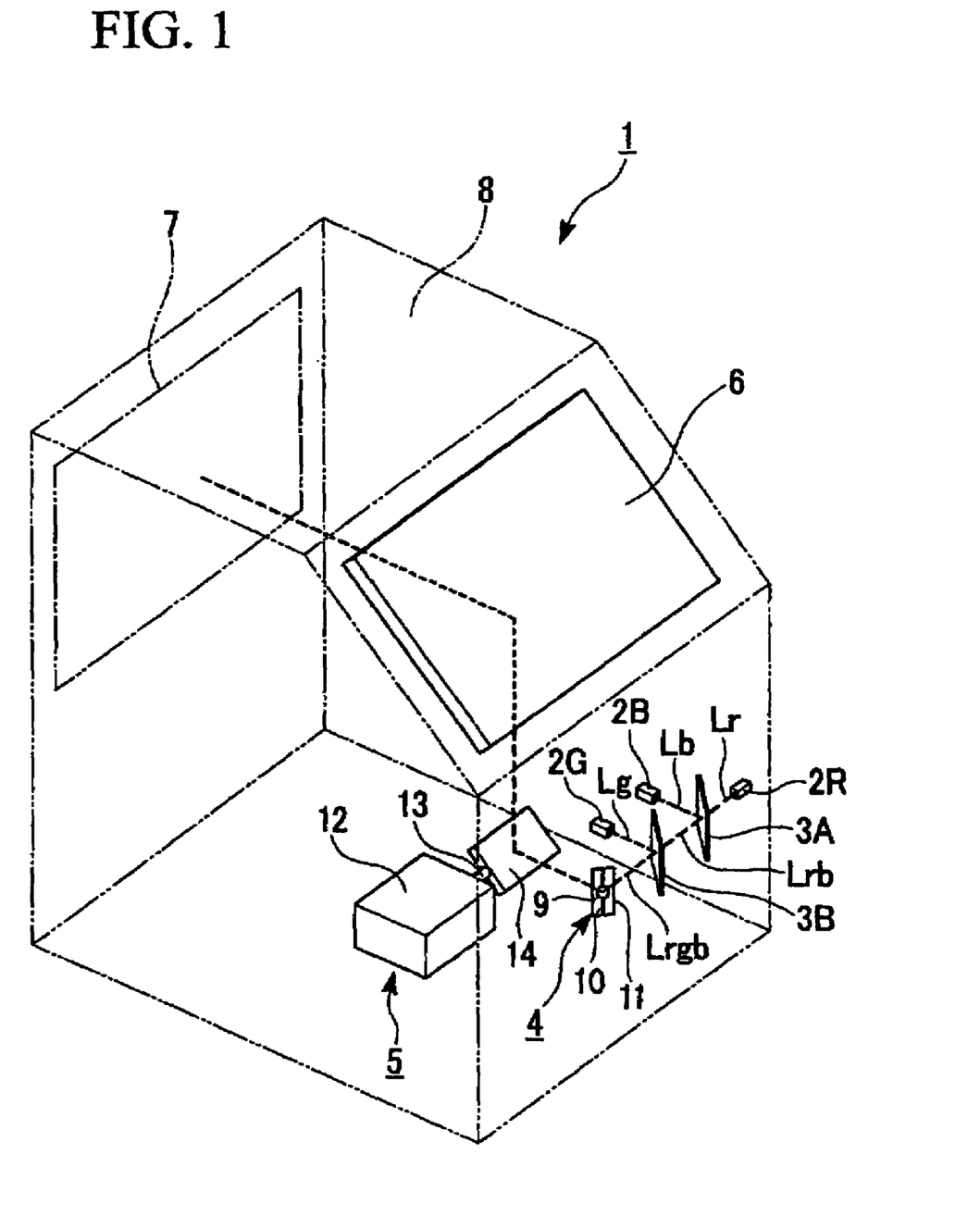
FIG. 1 is a perspective view of the main sections of the image display device of the first embodiment of the invention.

FIG. 1 is a perspective view of the main sections of the laser scanning-type image display device of the first embodiment. FIG. 2 is a functional block diagram of the control section of the same device. FIG. 3 is a timing chart of each type of control signal in the control section.

A laser scanning-type image display device 1 (hereinafter simply referred to as an image display device) of the first embodiment includes laser light source sections 2R, 2G, and 2B (light source section), dichroic mirrors 3A and 3B, a MEMS scanner (horizontal scanner) 4, a galvano-scanner (vertical scanner) 5, a projection direction changing mirror 6, a screen 7, and a case 8.

The laser light source sections 2R, 2G, and 2B respectively emit laser light of the colors red (R), green (G), and blue (B).

The laser scanning-type image display device 1 is referred to as a rear-projection type image display device. In the laser scanning-type image display device 1, the laser light source sections 2R, 2G, and 2B and the above described optical systems are housed in the case 8, images have projected from the back surface side of the transparent screen 7 are viewed from the front surface of the screen 7.

Each of the laser light source sections 2R, 2G, and 2B are disposed so that the light path of the blue light Lb that is emitted from the blue laser light source section 2B and the light path of the green light Lg that is emitted from the green laser light source section 2G are orthogonal the light path of the red light Lr that is emitted from the red laser light source section 2R.

The dichroic mirror 3A is installed at the position at which the light path of the red light Lr from the red laser light source section 2R and the light path of the blue light Lb from the blue laser light source section 2B intersect. The dichroic mirror 3A reflects the blue light Lb and transmits the red light Lr.

The dichroic mirror is installed at the position at which the light path of the light Lrb composed of the red light Lr and the blue light Lb and the light path of the green light Lg from the green laser light source section 2G intersect. The dichroic mirror 3B reflects the green light Lg and transmits the red light Lr and the blue light Lb.

The dichroic mirror 3A is disposed at an angle whereby the blue light Lb is made incident on the reflecting surface of the mirror at an incident angle of 45 degrees. The dichroic mirror 3B is disposed at an angle whereby the green light Lg is made incident on the reflecting surface of the mirror at an incident angle of 45 degrees.

The lights from the laser light source sections 2R, 2G, and 2B are synthesized by the dichroic mirrors 3A and 3B to become light that forms a full color image.

The MEMS scanner 4 scans the light Lrgb following its synthesis by the dichroic mirrors 3A and 3B in the horizontal direction of the screen 7 and is disposed in the light path of the light Lrgb after its synthesis.

In the first embodiment, the MEMS scanner 4 draws an image in reciprocating motion during scanning of light from the left to the right of the screen 7 and during scanning of light from the right to the left of the screen 7.

The MEMS scanner 4 integrates a movable mirror 9, a torsion bar 10, and a support frame 11 using, for example, single-crystal silicon micromachining technology.

The movable mirror 9 reciprocally rotates in a predetermined range centered on the torsion bar by, for example, the twisting force due to electrostatic force and restoring force of the torsion bar 10.

By this force, the MEMS scanner 4 can scan light with a predetermined deflection angle in the circumferential direction of the rotational movement.

The galvano-scanner 5 is disposed in the light path of the light that is emitted from the MEMS scanner 4. The galvano-scanner 5 scans the light Lrgb following its synthesis by the dichroic mirrors 3A and 3B in the vertical direction of the screen 7.

The galvano-scanner 5 of the first embodiment draws an image in one direction of scanning from the top to the bottom of the screen 7.

The galvano-scanner 5 includes a mirror 14 that is rotatable at a centered drive axis 13 of a motor 12.

By the rotating operation of the mirror 14, the galvano-scanner 5 can scan light with a predetermined deflection angle in the circumferential direction of the rotational movement.

Figure 2:
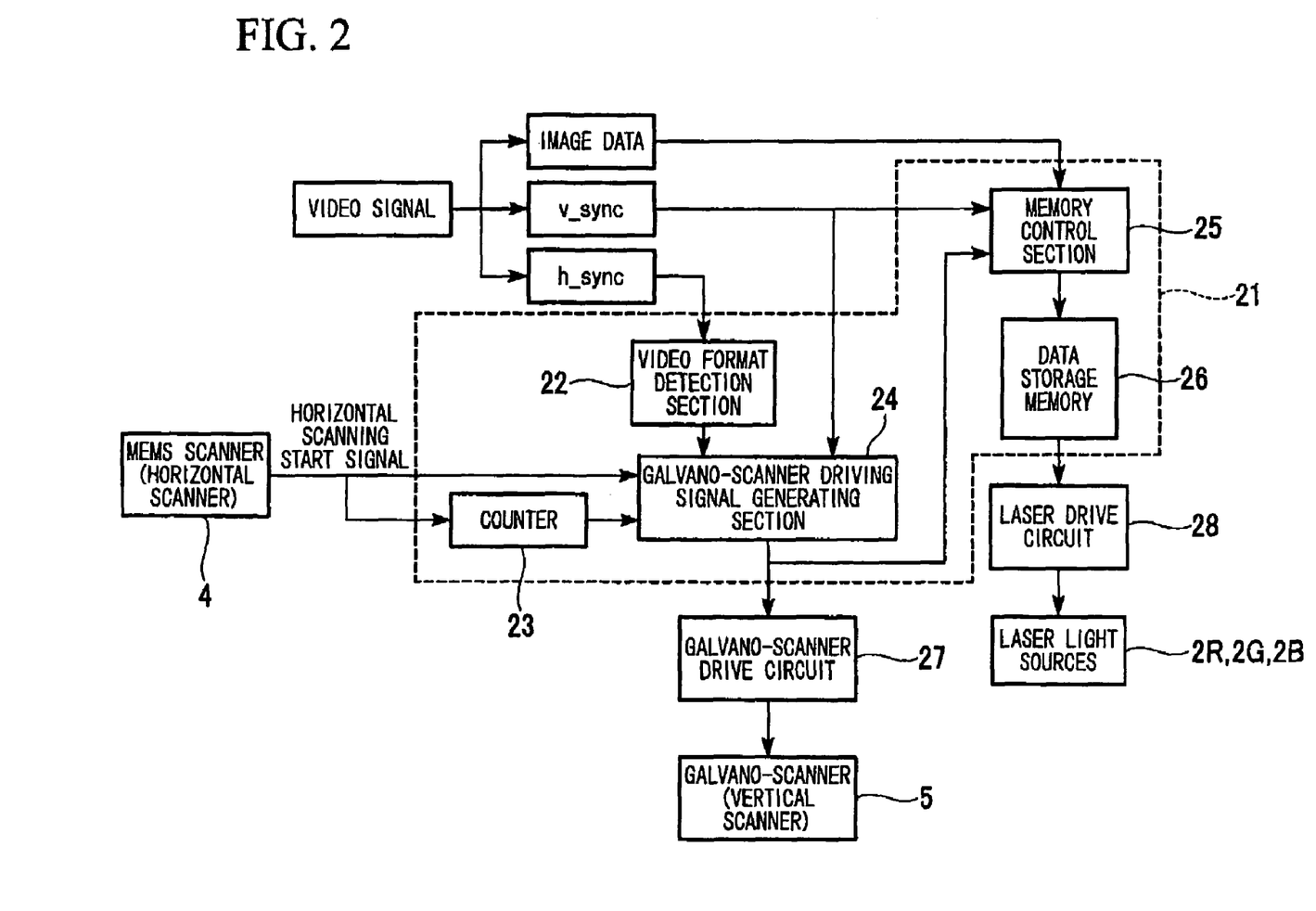
FIG. 2 is a functional block diagram of the control section of the image display device of the first embodiment of the invention.

As shown in FIG. 2, a control section 21 (vertical scanner control section) of the image display device 1 of the first embodiment includes a video format detection section 22, a counter 23, a galvano-scanner driving signal generating section 24, a memory control section 25, and a data storage memory 26 and so on.

The video signal includes pixel data including color information, brightness information, or the like of each pixel, a vertical synchronizing signal (hereinafter denoted as v_sync), and a horizontal synchronizing signal (hereinafter denoted as h_sync).

The video format detection section 22, upon receiving the horizontal synchronizing signal h_sync in the video signal, detects the format (resolution) of the video signal that is currently being input.

Also, the counter 23, upon receiving a series of horizontal scanning start signals from the MEMS scanner 4, counts the number of scan lines that the MEMS scanner 4 has scanned (corresponding to the pulse number of the horizontal scanning start signals in one frame).

The galvano-scanner driving signal generating section 24, upon receiving the image format, the vertical synchronizing signal v_sync, the horizontal synchronizing signal h_sync, and the scan line number data in a frame from the counter 23, determines whether or not the horizontal scanning start signal that is input is the first horizontal scanning start signal following the input of the vertical synchronizing signal described below, and determines whether the horizontal scanning start signal that is first input following the input of the vertical synchronizing signal is on the outgoing side or the returning side to thereby generate a vertical scanning start signal and a speed signal, or the like.

The data storage memory 26 is memory for storing pixel data of the plurality of horizontal scan line portions (in the first embodiment, at least two scan line portions).

The memory control section 25, upon receiving the pixel data and vertical synchronizing signal v_sync or the determination result of the outgoing side or returning side of the horizontal scanning start signal from the galvano-scanner driving signal generating section 24, detects the deviation state between the pixel data and the horizontal scan and vertical scan.

Along with determining the data quantity to be stored in the data storage memory 26, a write timing signal readout timing signal, and reverse readout signal or the like are generated.

A galvano-scanner drive circuit 27, upon receiving the vertical scanning start signal, the speed signal, or the like from the galvano-scanner driving signal generating section 24, generates a signal for actually driving the galvano-scanner 5 and drives the galvano-scanner 5.

A laser drive circuit 28 receives the pixel data that is read from the data storage memory 26, generates a signal for actually driving the laser light source sections 2R, 2G, and 2B and drives the laser light source sections 2R, 2G, and 2B.

Here, an example of scanner control in the image display device 1 of the first embodiment will be described.

The video format is assumed to be 1080 p (resolution: 1920×1080 {2200×1125}, 60 Hz) for widescreen and hi-definition video.

The resolution in brackets represents the value incorporating the flyback time of the light beam.

When designing the MEMS scanner 4 so as to be able to correspond to a video signal having this video format, it is necessary to manufacture a MEMS scanner 4 that resonates at a frequency of scanning 1125 lines (the target scan line number) in 1/60 of a second (the time for 1 frame).

That is, considering the fact that the MEMS scanner 4 of the first embodiment reciprocally draws pictures, it is necessary to manufacture a MEMS scanner 4 that resonates at 1125 lines×60 Hz/2=33.75 kHz.

However, it is extremely difficult to manufacture the MEMS scanner 4 with not even 1 Hz of displacement from the resonance point.

For example, in the case of a design target value of 33.75 kHz, assume that a MEMS scanner 4 is produced that resonates at 34 kHz, that is, a scanner with an operational speed that is faster than the design value at the resonance point.

In this case, the MEMS scanner 4 with a resonance frequency of 34 kHz draws 1,133.33 lines (scannable line number) in 1 frame (1/60 second).

At this time, when assuming ordinary vertical scanning (continuous vertical scanning) is performed by driving the galvano-scanner 5 at 60 Hz, since the number of drawn lines is not an integer, at the point of time when the vertical scanner (galvano-scanner 5) moves to its initial position (for example, the top end of the screen 7), the horizontal scanner (MEMS scanner 4) has not returned to its initial position. Assuming the initial position of horizontal scanning is the left end of the screen 7, the drawing position has advanced 0.33 of a line (⅓ a line) from the left end of the screen 7.

That is, a state results in which the horizontal scanning and the vertical scanning cannot be not synchronized.

Note that manufacturing errs in the galvano-scanner 5 are hardly present and so can be ignored.

In the 1080 p video format, the period from line 1,081 to line 1,125 is called flyback time, which is the time during which no actual drawing is performed (in other words, black lines are drawn).

Accordingly, even when the MEMS scanner 4 scans beyond 1081 lines, since there is no pixel data therein, the picture is unaffected.

Figure 3:
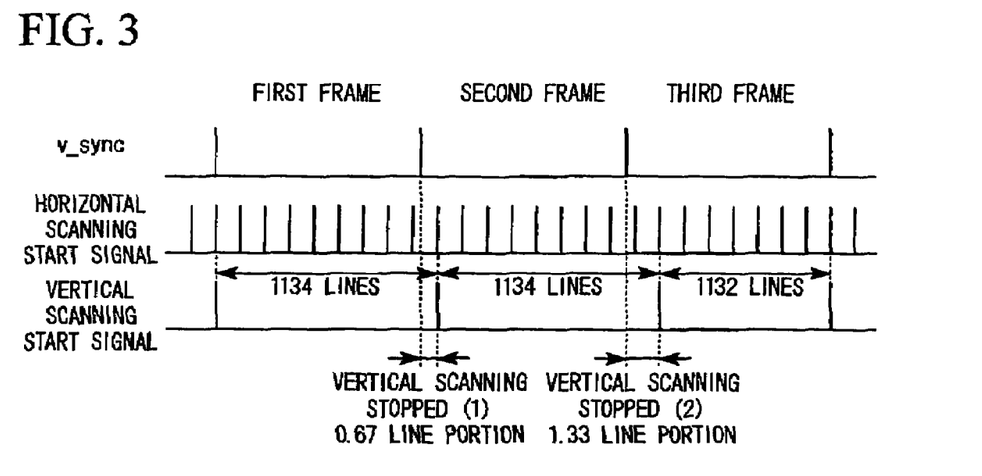
FIG. 3 is a timing chart of each type of control signal of the first embodiment of the invention.

Therefore, as shown in FIG. 3, in a given single frame (referred to in this description as the first fine for convenience) in which the vertical synchronizing signal, the horizontal scanning start signal, and the vertical scanning start signal are all synchronized, after the horizontal scanning of 1,133.33 lines is complete, during the time required for scanning of the 0.67 line portion until the 1,134th line, the galvano-scanner 5 is temporarily stopped to stop the vertical scanning.

However, the galvano-scanner 5 is not simply stopped, and instead the drawing position of the galvano-scanner 5 is returned to the initial position during the time for the above described 0.67 line portion.

At the point of time when the time required for scanning of that 0.67 line portion has elapsed, the vertical scanning by the galvano-scanner 5 is restarted.

At this time, a state thus arises in which the input timing of the horizontal scanning start signal and the vertical scanning start signal are synchronized, and so horizontal scanning enters the initial position (for example, the left end of the screen 7) in synch with the initial position of the vertical scanning (for example, the top end of the screen 7).

Note that the vertical synchronizing signal has already been input at the point of time at which the horizontal scanning of the 1,133.33 line portions is complete.

Thereafter, by repeating the above described control the entire picture is drawn.

For example, the subsequent second frame is drawn from the 1,134th line to the 2,266.67th line, counting from the start of the first frame.

At this time, the drawing position of the horizontal scanning has advanced 0.67 of a line (⅔ line portion) from the left end of the screen.

Here, since this time is the second frame, the stoppage time of the galvano-scanner 5 is for 0.67 line (the stoppage time of the galvano-scanner 5 for one frame)×2=1.33 lines (⁴⁄₃ lines).

That is, following the horizontal scanning of 2,266.67 lines, during the time for the 1.33 lines (until the 2,268th line), the galvano-scanner 5 is temporarily stopped to stop the vertical scanning. At the point of time when the time required for passing the 1.33 lines has elapsed, the vertical scanning by the galvano-scanner 5 is restarted.

Next, the stoppage time in the third frame is similarly calculated as 0.67 line (the stoppage time of the galvano-scanner 5 for one frame)×3=2 lines.

In this case, since there is no fraction after the decimal point, the drawing position after scanning of the third frame becomes the initial position of the horizontal scanning.

Accordingly, the number of horizontal scans for a single vertical scan may be reduced by two times (two lines) without stopping the galvano-scanner 5.

Since the time corresponding to the reduced two lines corresponds to the flyback time, picture quality is unaffected.

When the third frame is complete, at the point of time of the start of the fourth frame, similarly to the point of time of the start of the first fine, the vertical synchronizing signal, the horizontal scanning start signal, and the vertical scanning start signal are all in a synchronized state.

Thus, it is henceforth possible to display a picture without failure by repeating the above process.

Note that in order to make FIG. 3 easy to understand, the first frame is shown to consist of only 10 horizontal scanning lines, the second frame 10 horizontal scanning lines, and the third frame 8 horizontal scanning lines.

In the image display device 1 of the first embodiment, as described above, the vertical scanning by the galvano-scanner 5 is temporarily stopped during the flyback time after the MEMS scanner 4 has completed the horizontal scanning in a given frame. After the predetermined stoppage time has elapsed, the vertical scanning is restarted from the initial position in synch with the horizontal scanning start signal of the next frame.

Since the horizontal scanning and vertical scanning are reliably synchronized by applying such control, it is possible to achieve a scanning-type image display device that has favorable display quality with no image distortion.

Also, since synchronization is achieved between the video signal and the scanners, the problem does not arise of undisplayable frames being generated.

In particular, in the case of the first embodiment, since it is possible to control the restart timing of vertical scanning by the galvano-scanner 5 in any frame with only the stoppage time that is found by calculation, other signals do not serve as a trigger, and so there is no need to monitor the horizontal scanning start signal, or the like.

For that reason, the circuit constitution of the galvano-scanner driving signal generating section 24 is simple.

A constitution was adopted in the first embodiment that completely and temporarily stopped vertical scanning by the galvano-scanner 5, however, the galvano-scanner 5 may move slightly without coming to a complete stop in order to facilitate control of the galvano-scanner 5 or the like. Also, it is possible to adopt a constitution that returns the galvano-scanner 5 to its initial position over the same time as the time during which vertical scanning is stopped in the first embodiment.

Modification of First Embodiment

The first embodiment described above covered the case of the operation speed of the MEMS scanner 4 being faster than the design value. Hereinafter, the opposite case of a slower MEMS scanner 4 shall be considered.

For example, in the case of a design target value of 33.75 kHz under the same preconditions as the embodiment described above, assume that a MEMS scanner 4 is produced that resonates at 32.5 kHz.

In this case, the MEMS scanner 4 with a resonance frequency of 32.5 kHz draws 1,083.33 lines (scannable line number) in 1 frame (¹⁄₆₀ second).

Even in this case, since nothing is drawn during the flyback time from line 1,081 to line 1,125, the picture is unaffected.

Therefore, similarly to the embodiment described above, during the time required for scanning of the 0.67 line portion until the 1,084th line after the horizontal scanning of 1,083.33 lines is complete, the galvano-scanner 5 is temporarily stopped to stop the vertical scanning. Then when the time required for scanning of that 0.67 line portion has elapsed, the vertical scanning by the galvano-scanner 5 is restarted.

The scanning of the second frame onward is performed similarly to the above described embodiment.

The case of the MEMS scanner 4 being made with an even slower operation speed of, for example, 32 kHz shall now be considered.

In this case, the MEMS scanner 4 draws 1,066.66 lines (scannable line number) in 1 frame (¹⁄₆₀ second).

Thus, the MEMS scanner 4 is no longer capable of drawing 1,080 lines in a single frame.

In this case, the MEMS scanner 4 must be regarded as a defective article and beyond the scope of being controlled by the method of the invention.

Second Embodiment

A second embodiment of the invention will be described herein

The basic constitution of the laser scan-type image display device of the second embodiment is completely identical to the first embodiment, with only the method of controlling the restart timing of the vertical scanning differing from the first embodiment.

This point will be described with reference to FIG. 4.

Figure 4:
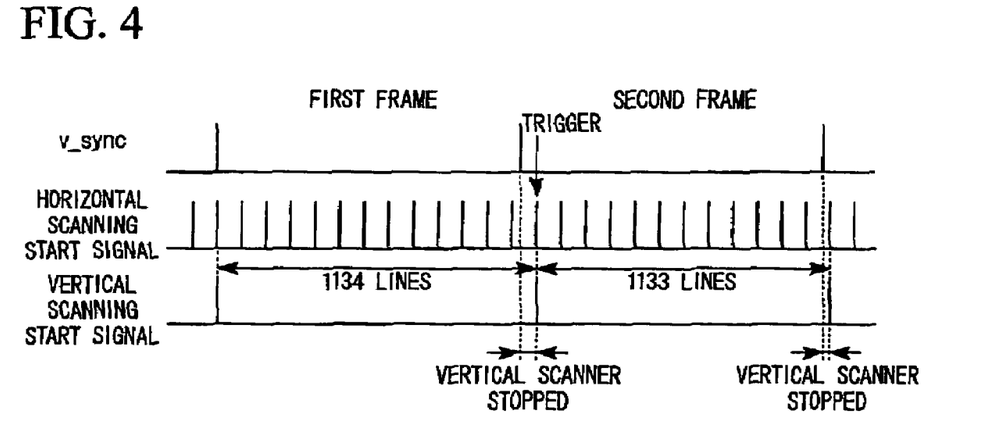
FIG. 4 is a timing chart of the second embodiment of the invention.

FIG. 4 is a timing chart of various types of control signals in the control section in the image display device of the second embodiment.

In the case of the second embodiment, as shown in FIG. 4, the horizontal scan line number (i.e., the number of horizontal scanning start signals) from the vertical scanning start signal of the first frame to the vertical scanning start signal of the second frame is 1,134 lines, and the horizontal scan line number from the vertical scanning start signal of the second frame to the vertical scanning start signal of the third frame is 1,133 lines.

That is, the horizontal scan line number in a single frame is not count, and varies from frame to frame.

In FIG. 4, in order to make the drawing easy to understand, the first frame is shown to consist of only 14 horizontal scanning lines, and the second frame is shown to consist of only 13 horizontal scanning lines.

Here, similarly to the first embodiment, a MEMS scanner 4 with a resonance frequency of 34 kHz is obtained, which draws 1,133.33 lines in 1 frame (1/60 second).

In this case, assuming the galvano-scanner 5 is always stopped until the 1,134th line after the horizontal scanning of 1,133.33 lines is complete, the drawing position at the second frame is displaced by one line in the example of FIG. 4. There is concern that image distortion occurs.

Therefore, the galvano-scanner driving signal generating section 24, after temporarily stopping the galvano-scanner 5, restarts the vertical scanning by the galvano-scanner 5 with the horizontal scanning start signal that is first input following the input of the vertical synchronizing signal (v_sync) of the second frame serving as a trigger.

Thus, it is possible to reliably synchronize the vertical scanning start signal and the horizontal scanning start signal for each frame.

Since the horizontal scanning and vertical scanning are reliably synchronized by the constitution of the second embodiment, it is possible to provide a scanning-type image display device that has favorable display quality with even less image distortion.

Third Embodiment

A third embodiment of the invention will be described hereinafter.

The basic constitution of the laser scan-type image display device of the third embodiment is completely identical to the first embodiment, with the method of controlling the restart timing of the vertical scanning being the same as the second embodiment.

Also, the third embodiment differs from the second embodiment only on the point of considering fluctuations in the resonance frequency of the MEMS scanner.

Figure 5:
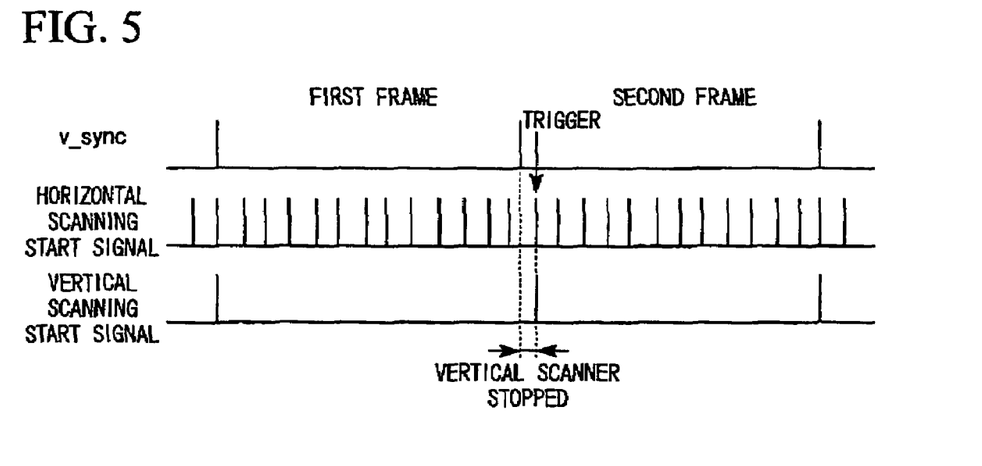
FIG. 5 is a timing chart of the third embodiment of the invention.

FIG. 5 is a timing chart of various types of control signals in the control section in the image display device of the third embodiment.

In the third embodiment, under the same preconditions as the first embodiment, the MEMS scanner 4 can be many to meet the design target value, so that the resonance frequency thereof becomes exactly 33.75 kHz.

In this case, it would seem that no problems would arise even if driven continuously at 60 Hz without temporarily stopping the galvano-scanner 5.

However, due to heat by the laser during use and heat that is produced from the actuator, the resonance point of the MEMS scanner 4 is constantly fluctuating.

Therefore, even if the MEMS scanner 4 can be manufacture as designed, image distortion will actually result similarly to the first embodiment.

Therefore, similarly to the second embodiment, it is desired to perform control that temporarily stops the galvano-scanner 5 until the horizontal scanning start signal is input directly after the input of the vertical synchronizing signal so that the drawing position of horizontal scanning moves to the left end at the initial position of the vertical scanning. However, since the resonance frequency of the MEMS scanner 4 is not constant in the third embodiment, the stoppage time of the galvano-scanner 5 would not change periodically, so that the stoppage time would be random.

For this reason, it is not possible to simply calculate the stoppage time of the galvano-scanner 5 for each frame as in the first embodiment.

Also, while no problem would arise if the horizontal scan line number in one frame is an even number such as 1,134 lines, when it is an odd number such as 1,133 lines, the drawing position of horizontal scanning would move to the right end at the initial position of the vertical scanning.

On the other hand, since a pixel data string that is synchronized with the vertical synchronizing signal is arranged from the left, which is the original initial position, to the right, there is concern that the image will be flipped horizontally.

Therefore, in the third embodiment, the galvano-scanner driving signal generating section 24 determines whether the first horizontal scanning sort signal following the input of the vertical synchronizing signal is a horizontal scanning start signal on the outgoing side in the frame or a horizontal scanning start signal on the returning side, and, in accordance with the determination result, brings into alignment the scanning direction of the horizontal scanning by the MEMS scanner 4 and the output order of the pixel data string in the video signal.

Thereby, flipping of the image can be prevented

Also, there are two methods of bringing into alignment the scanning direction of the horizontal scanning and the output order of the pixel data string.

In the first method, when the galvano-scanner driving signal generating section 24 determines that "the horizontal scanning start signal that is first input following the input of the vertical synchronizing signal is a horizontal scanning start signal on the returning side", the galvano-scanner driving signal generating section 24 keeps the vertical scanning by the galvano-scanner 5 stopped. And when it determines that the horizontal scanning start signal is "a horizontal scanning start signal on the outgoing side", the galvano-scanner driving signal generating section 24 restarts the vertical scanning by the galvano-scanner 5 with the horizontal scanning start signal serving as a trigger.

On the other hand, in the second method, when the galvano-scanner driving signal generating section 24 determines that "the horizontal scanning start signal that is first input following the input of the vertical synchronizing signal is a horizontal scanning start signal on the returning side", the galvano-scanner driving signal generating section 24 restarts the vertical scanning by the galvano-scanner 5 with the horizontal scanning start signal serving as a trigger and in addition issues a command to the memory control section 25 to reverse the output order of the pixel data string in the video signal.

At this time, when the galvano-scanner driving signal generating section 24 determines that "the horizontal scanning start signal that is first input following the input of the vertical synchronizing signal is a horizontal scanning start signal on the outgoing side", it normally restarts the vertical scanning by the galvano-scanner 5 with the horizontal scanning start signal serving as a trigger (without reversing the output order of the pixel data string).

According to the constitution of the third embodiment, even if the resonance frequency of the MEMS scanner 4 fluctuates in an unstable manner, since the horizontal scanning and the vertical scanning can be synchronized, it is possible to provide a high quality image with no image distortion.

Also, the above described first method and the second method each have their respective advantages. The advantage of the first method is that, although the pixel data string is temporarily stored in the data storage memory 26, to the extent of there being no need to reverse the pixel data string, the constitutions of the memory control section 25 and the laser drive circuit 28 are simplified.

On the other hand, in the first method, when the horizontal scanning start signal that is first input following the input of the vertical synchronizing signal is a horizontal scanning start signal on the returning side, it is necessary to store the pixel data in the data storage memory 26 while stopping the vertical scanning, thus requiring the necessary storage capacity therefor.

However, there is no such requirement for that in the second method, and so the storage capacity of the data storage memory 26 may be less compared to the first method.

Fourth Embodiment

A fourth embodiment of the invention will be described hereinafter.

The basic constitution of the laser scan-type image display device of the fourth embodiment is identical to the first embodiment, and in addition, the counter 23 of the control section 21 functions as a horizontal scanning frequency detecting section that detects the actual scanning frequency of the MEMS scanner 4.

The galvano-scanner driving signal generating section 24 additionally has a function to send a speed signal to the galvano-scanner drive circuit 27 that controls the driving speed of the galvano-scanner 5 and change the scanning frequency of the galvano-scanner 5 in response to fluctuations in the scanning frequency of the MEMS scanner 4 detected by the counter 23.

For example, when the scanning frequency of the MEMS scanner 4 randomly fluctuates as in the case of the third embodiment, assuming the galvano-scanner 5 is running at the same speed as when the MEMS scanner 4 is operating at 33.75 kHz, the drawing position slightly deviates for each horizontal line in response to fluctuations in the scanning frequency of the MEMS scanner 4.

Normally, since changes in the scaring frequency of the MEMS scanner 4 are at most a few Hz, the deviation in the drawing position is limited to 0.01% (a few Hz with respect to tens of kHz), and so there is little effect.

However, in the event of there being a need to correct such a small degree of deviation such as when viewing a high-definition image on a large screen, if the horizontal scanner (MEMS scanner 4) is 0.01% faster than the design value with the above constitution, the vertical scanner (galvano-scanner 5) may also be made 0.01% faster.

Thereby, even fine displacement of the drawing position in each line can be corrected, and so the display quality can be further improved.

The technical scope of the invention is not limited to the foregoing description, and additions, omissions, substitutions, and other modifications can be made without departing from the spirit or scope of the invention.

For example, in the above described embodiments, examples were given of the scanner for horizontal scanning being a MEMS scanner, and the scanner for vertical scanning being a galvano-scanner. However, the scanners are not limited thereto, and it is possible to use other types of scanners.

However, the scanner for high-speed horizontal scanning is preferably a resonant-type scanner.

Also, examples were given in which the horizontal scanner performs reciprocal scanning in which the left end serves as the initial position, and the vertical scanner performs one-way scanning in which the top end serves as the initial position, but this can also be appropriately modified.

In addition, the foregoing specific disclosures relating to the constitution of the image display device and the video formats etc. are merely examples and appropriate modifications may be made.

Also, as an overall image display device, an example of a rear-projection type image display device was provided, but the invention may be suitably applied to a front projection-type image display device.

Accordingly, the invention is not to be considered as being limited by the foregoing description, and is only limited by the scope of the appended claims.

What is clamed is:

1. A scanning image display device comprising:
a light source section that emits light;
a horizontal scanner that scans the light in a horizontal direction;
a vertical scanner that scans the light in a vertical direction; and
a vertical scanner control section that controls an operation of the vertical scanner, in such a manner that, when a discrepancy occurs between a target scan line number at which the horizontal scanner is to scan as determined by a format of a video signal and a scannable line number at which the horizontal scanner is actually capable of scanning, and when a difference obtained by subtracting the target scan line number from the scannable line number is a positive value, the vertical scanner control section controls the vertical scanner so as to put vertical scanning by the vertical scanner on standby within a time range from a point of time at which horizontal scanning by the horizontal scanner is completed in a first frame to a point of time at which a horizontal scanning start signal corresponding to a vertical synchronizing signal of the video signal in a second frame is input, and restarts the vertical scanning by the vertical scanner in synchronization with an input timing of the horizontal scanning start signal.

2. The scanning image display device according to claim 1, wherein
the vertical scanning by the vertical scanner is put on standby by temporarily stopping the vertical scanner.

3. The scanning image display device according to claim 2, wherein
when the scannable line number is not an integer, the vertical scanner control section calculates a stoppage time that corresponds to a difference obtained by subtracting the scannable line number from the next integer greater than the value of the scannable line number, stops the vertical scanning by the vertical scanner for just the stoppage time from the point of time at which the horizontal scanning is completed by the horizontal scanner in the first frame, restarts the vertical scanning by the vertical scanner after the stoppage time has elapsed, and calculates from the second frame onward a stoppage time in any frame based on the stoppage time.

4. The scanning image display device according to claim 1, wherein
the vertical scanner control section restarts the vertical scanning by the vertical scanner with the horizontal scanning start signal that is first input following the input of the vertical synchronizing signal in the second frame serving as a trigger.

5. The scanning image display device according to claim 4, wherein
the horizontal scanner scans the lights in reciprocation, and the vertical scanner control section determines whether the horizontal scanning start signal that is first input following the input of the vertical synchronizing signal in the second frame is a horizontal scanning start signal on the outgoing side or a horizontal scanning start signal on the returning side, and brings into alignment the scanning direction of the horizontal scanner and the output order of the pixel data string in the video signal in accordance with that determination result.

6. The scanning image display device according to claim 5, wherein
when the vertical scanner control section determines that the horizontal scanning start signal that is first input following the input of the vertical synchronizing signal in the second frame is, among the horizontal scanning start signal on the outgoing side and the horizontal scanning start signal on the returning side, a horizontal scanning start signal in which the scanning direction of the horizontal scanner does not agree with the output order of the pixel data string in the video signal, the vertical scanner control section keeps the vertical scanning by the vertical scanner stopped, and when the vertical scanner control section determines that the horizontal scanning start signal is a horizontal scanning start signal in which the scanning direction of the horizontal scanner agrees with the output order of the pixel data string in the video signal, the vertical scanner control section restarts the vertical scanning by the vertical scanner with the horizontal scanning start signal serving as a trigger.

7. The scanning image display device according to claim 5, wherein
when the vertical scanner control section determines that the horizontal scanning start signal that is first input following the input of the vertical synchronizing signal in the second frame is, among the horizontal scanning start signal on the outgoing side and the horizontal scanning start signal on the returning side, a horizontal scanning start signal in which the scanning direction of the horizontal scanner does not agree with the output order of the pixel data in the video signal, the vertical scanner control section restarts the vertical scanning by the vertical scanner with the horizontal scanning start signal serving as a trigger and in addition reverses the output order of the pixel data string in the video signal.

8. The scanning image display device according to claim 1, further comprising
a horizontal scanning frequency detecting section that detects the scanning frequency of the horizontal scanner, wherein the vertical scanner control section is additionally provided with a function to change the scanning frequency of the vertical scanner in response to fluctuations in the scanning frequency of the horizontal scanner detected by the horizontal scanning frequency detecting section.

9. The scanning image display device according to claim 1, wherein
the horizontal scanner is a resonating MEMS scanner.

10. A scanning image display device comprising:
a light source section that emits light;
a horizontal scanner that scans the light in a horizontal direction;
a vertical scanner that scans the light in a vertical direction; and
a vertical scanner control section that controls the vertical scanner so that the vertical scanner temporarily stops within a time range from a point of time at which horizontal scanning by the horizontal scanner is completed in a first frame to a point of time at which a horizontal scanning start signal corresponding to a vertical synchronizing signal of the video signal in a second frame is input, and restarts vertical scanning by the vertical scanner in synchronization with an input timing of the horizontal scanning start signal.

11. The scanning image display device according to claim 10, wherein
the horizontal scanner is a resonating MEMS scanner.

\* \* \* \* \*